Figure 1:
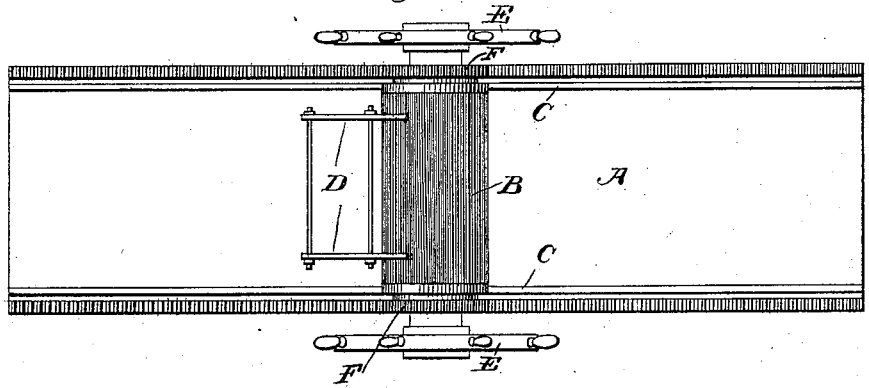

(No Model.)

C. C. HARTUNG.
METHOD OF MAKING PLATE GLASS.

No. 588,574. Patented Aug. 24, 1897.

Witnesses:
G. A. Pennington.
G. R. Cornwall

Inventor:
Charles C. Hartung
by Paul Bakewell
his Atty

UNITED STATES PATENT OFFICE.

CHARLES C. HARTUNG, OF ST. LOUIS, MISSOURI, ASSIGNOR TO EDWARD WALSH, JR., OF SAME PLACE.

METHOD OF MAKING PLATE-GLASS.

SPECIFICATION forming part of Letters Patent No. 588,574, dated August 24, 1897.

Application filed September 3, 1896. Serial No. 604,705. (No specimens.)

*To all whom it may concern:*

Be it known that I, CHARLES C. HARTUNG, a citizen of the United States, residing at the city of St. Louis, State of Missouri, have invented a certain new and useful Method of Making Plate-Glass, of which the following is a full, clear, and exact description, such as will enable others skilled in the art to which my invention appertains to practice the same.

In the drawings I have illustrated an apparatus for carrying my invention into effect, which apparatus I have found to answer the purpose admirably, but it is obvious that there are other forms of apparatus which could as advantageously be used without in the least departing from the nature and principle of my invention.

Figure 2:
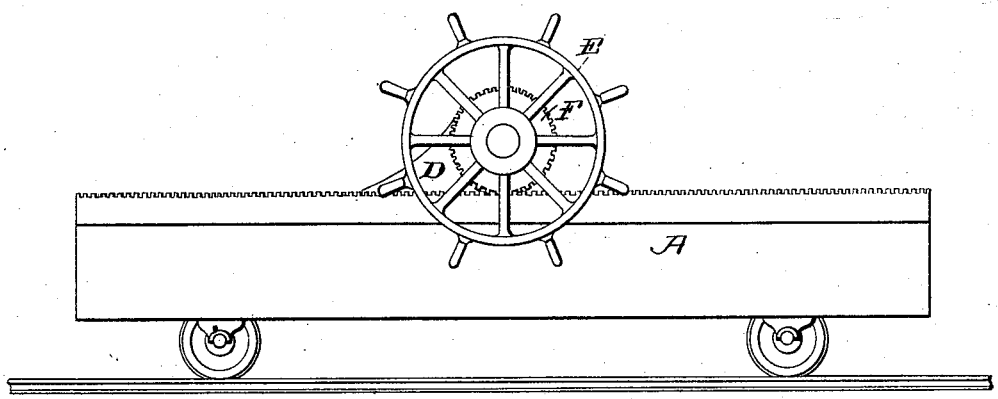
Figure 3:
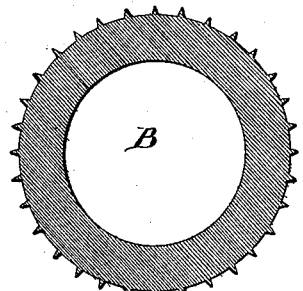

Figure 1 of said drawings illustrates a top plan view of a machine upon which my invention can be practiced. Fig. 2 is a side elevational view, and Fig. 3 is an enlarged cross-sectional view, of the roller.

Heretofore the method most usually practiced in the manufacture of rolled plate-glass contemplated the use of a bed-plate or casting-table and a roller or rollers which spread the molten glass out in sheet form on the table, after which the glass was annealed. In practicing this old method of making plate-glass the plate of glass would have an imperfect upper surface, due, it is thought, to the contraction of the molten glass after it had been spread on the casting-table. These imperfections existed in the form of waves or undulations on the upper surface, which extended longitudinally the sheet, making the glass of varying thickness and rendering it less valuable than if such imperfections were not present. These imperfections are always present in glass known in the market as "cathedral," "rough plate," or "skylight," and to my knowledge, although many attempts have been made to remedy these defects in the manufacture of the glass, I am not aware that such has ever been successfully accomplished. I have discovered that if a rough, as distinguished from a smooth, roller be employed to roll the glass said glass after being rolled into plate form and permitted to form its natural surface this surface will by reason of the heat still contained in the body of the sheet of glass become smooth and even and thus not present the imperfections to which I have referred.

Briefly stated, therefore, my invention may be said to consist in the method herein described of making plate-glass, first, by spreading the molten glass with a rough roller, permitting the glass to form its own upper surface, making an even upper surface by reason of the self-contained heat in the glass, and, finally, annealing the glass, whereby a smooth, even, and almost perfect surface is obtained.

In the drawings, A is the bed or casting-table, and B the roller, which preferably rests upon two straight fillets C, arranged along the surface of the table.

D is a guide which rests upon the table in front of the roller and serves to limit the width of the sheet of glass produced.

At each end of the roller are hand-wheels E, by which it can be turned and caused to roll along the table. The ends of the roller are also provided with gears F, which mesh with toothed racks arranged along the sides of the table A. These racks and gears serve to keep the roller correctly in position across the table.

So far as the above description goes it relates to ordinary forms of glass-rolling machines, but my invention contemplates a roughened instead of a smooth roller. The roughened roller used in connection with my invention is formed by roughening the surface in any manner, but preferably by corrugating the same longitudinally. Glass rolled by such a roller temporarily bears the impression of the roughened roller, but the self-contained heat in the newly-rolled sheet causes the upper surface of the glass to flow and seek its own proper level, thus obliterating the impression made by the roughened roller. In practicing my invention the molten glass to be rolled is of the usual consistency or heat.

In the experiments I have conducted relative to the practice of my invention I have found that rollers having varied degrees of roughness are to be used, depending upon the thickness of the glass to be rolled. The heavier the glass the deeper may be the impressions, while with thinner glass the impressions should be shallow.

The resultant sheet of glass made by the method herein described and with a single rough roller has a surface which is smooth and even compared with the glass heretofore made. The longitudinally-extending waves or undulations seem to be broken at the surface, so that such waves are interrupted at nearly right angles to their line of formation, and being thus broken up into "short lengths," as it might be called, when the upper surface of the glass forms its own surface it will also correct any unevenness which otherwise would have been present in the glass.

Having thus described my invention, what I claim, and desire to secure by Letters Patent of the United States, is—

1. The method of making plate-glass, the same consisting in spreading the molten glass into plate form, cutting up, grooving, or impressing its upper surface while it is being spread, and permitting the glass to form a smooth, even surface; substantially as described.

2. The method of making plate-glass, the same consisting in spreading the molten glass into plate form, indenting, grooving, or forming an uneven upper surface while the glass is still in a molten state, and permitting the glass to form a smooth upper surface by reason of its self-contained heat; substantially as described.

3. The method of making plate-glass, the same consisting in spreading the molten glass into plate form, indenting, cutting, or otherwise forming impressions in its upper surface transversely the sheet, and permitting the glass to form its own upper surface; substantially as described.

In testimony whereof I hereunto affix my signature, in presence of two witnesses, this 20th day of August, 1896.

CHARLES C. HARTUNG.

Witnesses:
F. R. CORNWALL,
G. A. PENNINGTON.